April 18, 1950 W. I. MATTHEWS 2,504,341

DIVERSITY RECEIVER

Filed Dec. 27, 1946 2 Sheets-Sheet 1

INVENTOR.
WALTER I. MATTHEWS.
BY H. S. Grover
ATTORNEY.

DIVERSITY RECEIVER

Filed Dec. 27, 1946 2 Sheets-Sheet 2

INVENTOR.
WALTER I. MATTHEWS.
H. S. Grover
ATTORNEY.

Patented Apr. 18, 1950

2,504,341

UNITED STATES PATENT OFFICE 2,504,341

DIVERSITY RECEIVER

Walter I. Matthews, Riverhead, N. Y., assignor to Radio Corporation of America, a corporation of Delaware Application December 27, 1946, Serial No. 718,866

3 Claims. (Cl. 250—20)

This application discloses a novel method of and means for diversified reception of signals.

The invention is applicable to reception of signals of various types wherein transmission of the carrier and both side bands takes place. The invention is in particular applicable to reception of signals wherein sustained modulation takes place and as a consequence, side band energy is continuously present such as, for example, radio, photo, telegraph, facsimile and music. The invention also applies to reception of signals such as voice or the like.

The general object of my invention is improved diversity reception.

A further object of my invention is to reduce distortion effects due to selective fading in diversity systems.

In diversity systems, as known today, various methods and means are made use of to select that signal having the strongest carrier to supply the useful output.

Distortion in the receiver output results from an unfavorable ratio between the carrier strength and side band strength and a more detailed object of my invention is a method of and means for selecting the signal having the most favorable carrier to side band ratio as well as the signal having the strongest carrier. My invention includes a method of and means for investigating the ratio of the carrier energy to the side band energy in each of the diversified signals and discarding the signal in or from that receiver wherein an unfavorable ratio appears. Thus, by the use of my method and means, I assure use of the signal having the strongest carrier and the least modulation distortion thereon.

Other objects and the advantages gained by attainment of the objects will appear in the detailed description which follows. In this description, reference will be made to the attached drawings wherein:

Fig. 3 is a circuit and block diagram of a diversity receiver system arranged in accordance with my invention.

Figure 1:
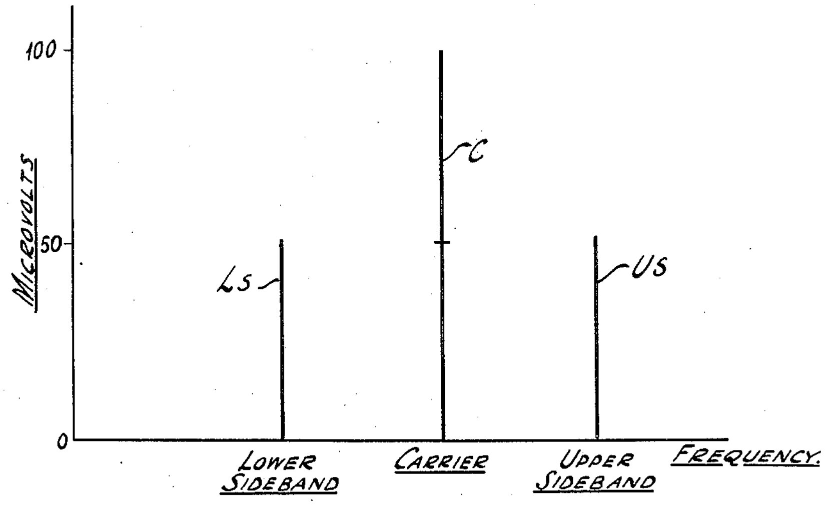
Figs. 1 and 2 are spectrum diagrams denoting relative amplitudes of the carrier and side bands of a signal such as might be picked up in one receiver of a diversity system of the nature involved here.

In the reception of short wave radio signals from a distant point, the well known effect of fading is experienced. The received signal varies in amplitude between wide limits. This change in amplitude is generally corrected by use of automatic volume control which allows the receiver gain to rise when the incoming carrier frequency is weak and lowers the gain when the incoming carrier is strong. The tendency of such a device is to maintain a constant carrier level from the diode output, and also to prevent the receiver from overloading due to unusually strong received signals.

In the reception of radio-telephone signals, or other signals where the intelligence to be conveyed is transmitted by the modulation of the carrier frequency, the receiver is required to receive not only the carrier frequency, but also the side band frequencies, normally extending a great distance to either side of the carrier frequency. For the best overall reception, the energy in the sidebands, in proportion to the carrier, should remain as it was when originally projected into space at the transmitter antenna. Under certain atmospheric conditions this proportion is altered and distortion occurs at the receiving point. This effect is known to the art as selective fading. Serious distortion is encountered when the carrier frequency fades to a low value in respect to the side bands, leaving the side band frequencies to beat against themselves.

Consider a carrier which is modulated at 100 percent by a single frequency tone. The radiated signal has three components: the carrier, the upper side band, the lower side band. At 100 percent modulation each side band contains one sixth of the total radiated power or one fourth of the energy in the carrier.

At the distant receiving point we will tune this signal in on a receiver which has a very narrow band width—so narrow that it separates the carrier from the side bands. I then measure the strength of the carrier only, in microvolts. Next, I tune in just one side band using this narrow band receiver and measure its strength. It will be found that the carrier magnitude is just about twice that of either side band. This is the normal condition for 100 percent modulation. If the carrier and side bands remain in this proportion, the effect of selective fading is absent. While the overall signal strength of the carrier and side bands may vary upward and downward, no selective fading effect is experienced until the original (at transmitter) ratio of the side band strength to the carrier strength is altered.

As an example, consider the two extreme conditions; first, when the strength of the carrier remains steady and both side band frequencies fade to zero, no distortion will result (the audio level merely decreasing to zero); hence, there will be no audio output. The second condition exists when the side band frequencies remain at a steady value and the carrier decreases to zero. This is the condition of extreme distortion. The side bands, having no carrier to beat against, beat against themselves, producing double frequency modulation. From the above, it will be seen that the ratio of the carrier strength to the side bands may increase without producing distortion since, effectively, this merely decreases the percentage of modulation. However, the ratio may not be decreased without accompanying distortion. During periods when selective fading is present, if the carrier frequency is set up on one receiver and each side band is set up on different receivers—all using the same antenna input—the observed effect is much the same as the output of three different antennas. In other words, there is random fading between the three components.

In the spectrum diagrams of Fig. 1, C represents the carrier, LS the lower side band and US, the upper side band. It is assumed that the carrier measures 100 microvolts input at the receiver with an upper side band and lower side band of 50 microvolts.

Figure 2:
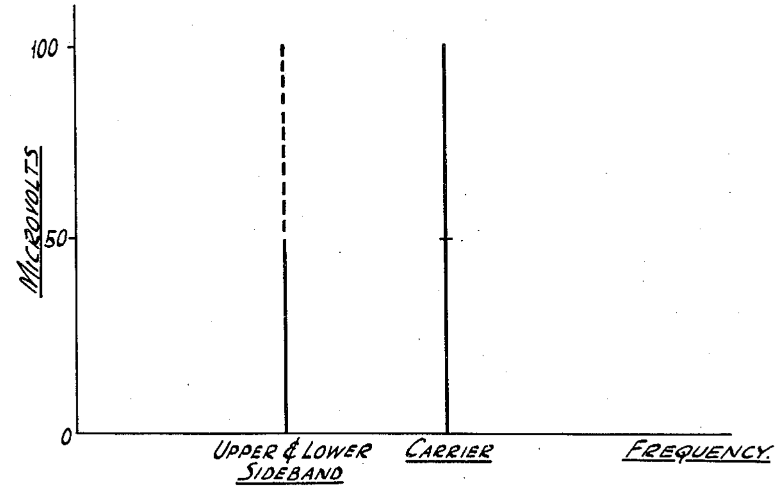
Figure 1:
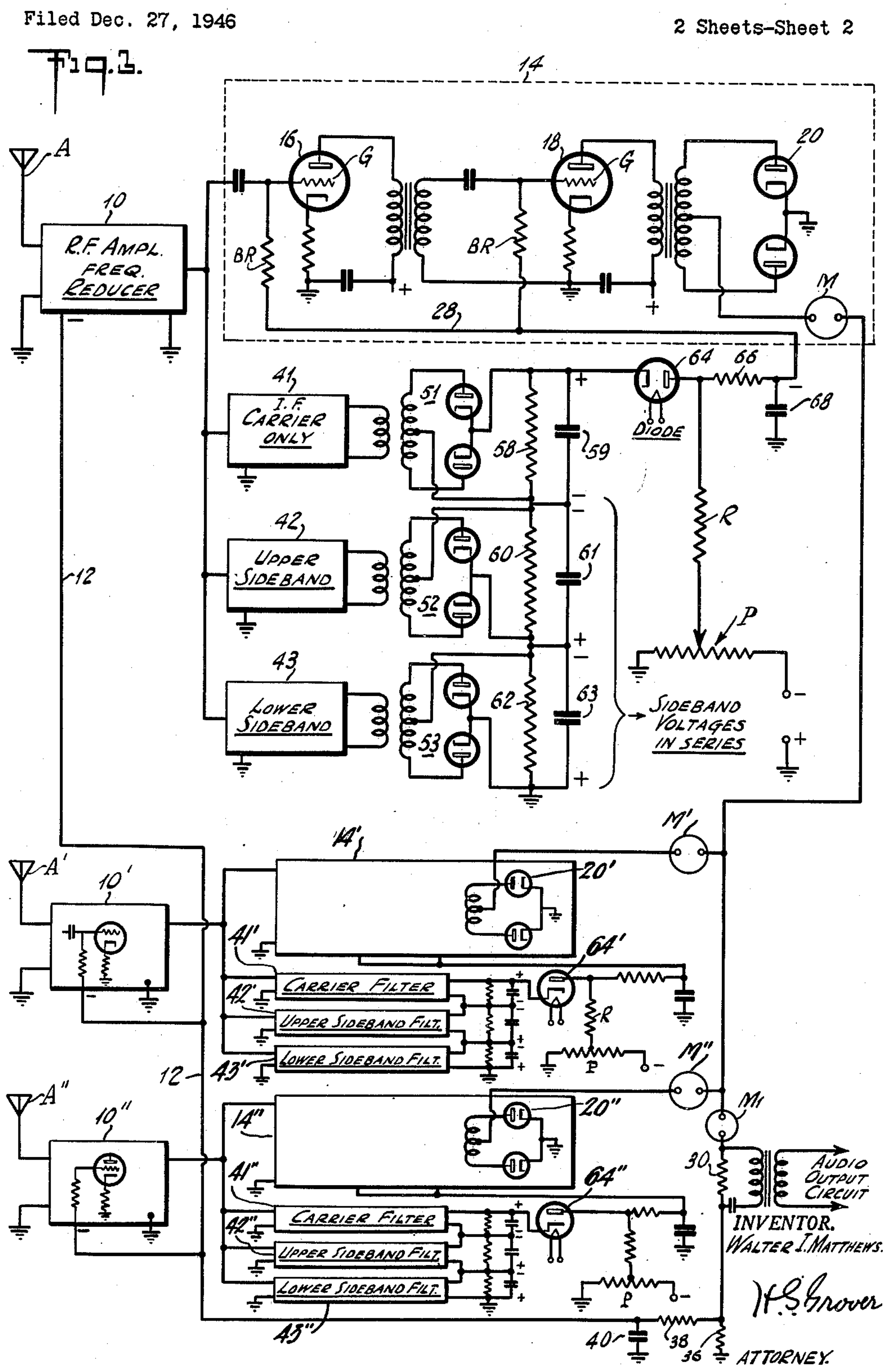

Fig. 2 shows the two side band voltages added in series, these being equal to the carrier voltage at 100 percent modulation. As long as the side band voltage does not exceed the carrier voltage, nomal 100 percent modulation—free of distortion—is obtained from the receiver. If the carrier fades below 100 microvolts, distortion begins to appear and maximum distortion is reached when the carrier is zero.

The condition of modulation without distortion is that $$\frac{Ecx}{Elo+Ehi}$$

is equal to or greater than 1, where $Ecx$ is the carrier voltage at the receiver, $Elo$ is the lower side band voltage at the receiver and $Ehi$ is the upper side band voltage at the receiver.

In normal diversity operation it is often found that one antenna which is contributing a very strong carrier will fade down to a point where its side band voltage is greater than the carrier voltage which is being supplied by the second or third antenna. The automatic volume control voltage, which governs the gain of the radio frequency amplifier, largely depends on the strength of the rectified carrier frequency. Therefore, two undesirable conditions exist when the carrier fails: first, the side band frequencies beat against themselves, giving rise to serious distortion; second, the distortion is emphasized by the rise in gain of the radio frequency amplifier, due to the lowering of the automatic volume control voltage.

I will now describe in detail one embodiment for carrying out my improved method and means. In this description, reference will be made to Fig. 3 of the drawings. The receiver as illustrated in Fig. 3 is in triple diversity. Diversification may be obtained by spacing the aerials A, A′ and A″ or by use thereat of different polarization (response) characteristics or of different frequencies. A three-receiver diversity system has been shown but the invention is equally applicable to a diversity system having more or less diversification. The three receivers are similar in many respects and one only thereof will be described in detail. Corresponding reference characters will be used in the three receivers with the reference characters of the receiver connected to A′, primed and those used in the receiver connected to the aerial A″, double primed. The aerial A supplies carrier and side band voltages or current to unit 10. The receivers may in many respects be similar to those used by my assignee, in which case the unit 10 includes a radio frequency amplifier with automatic gain control means therefor, a local oscillator, a mixer or converter and I. F. amplifiers, which may be subjected to automatic gain control potentials supplied over lead 12, as will be described hereinafter. The intermediate frequency output from unit 10 is supplied to a unit 14 enclosed in a dotted rectangle. This unit may include intermediate frequency amplifier stages 16 and 18 or more or fewer stages with the stage 18 supplying its output to a full wave detector 20. The tubes in the stages 16 and 18 or one or more thereof may have their control grids G connected by biasing resistors BR to a common volume or gain control lead 28 which will be described in detail hereinafter. The rectifiers 20 supply output through individual meters M and through a common meter M1 to a common load resistor 30. The meters M facilitate tuning by indicating the rectified current intensity while the meter M1 does likewise with respect to the total current. The load 30 may be transformer coupled to an audio or signal output circuit for use as desired. The resistor 30 is connected to ground by an automatic gain control potential resistor 36 which is coupled by resistor 38 and time delay condenser 40 to the lead 12 to accomplish automatic gain control in the receivers 10, 10′ and 10″. The system may operate in a well known manner such that the receiver getting the signal with the strongest carrier will operate through its intermediate frequency channel and rectifier 20 to produce output in 30 which represents predominantly signal in the said receiver getting the strong carrier. This receiver also primarily provides current which predominates in the gain control potential resistor 36 to provide a negative gain control potential on the line 12 of sufficient magnitude to reduce the gain in the remaining receivers so that these receivers do not respond to their weaker input signals to contribute to the receiver output.

The apparatus in unit 10 also supplies intermediate frequency carrier and side band energy to the filters 41, 42 and 43. The filter 41 passes carrier energy only. The filter 42 passes upper side band energy only and the filter 43 passes lower side band energy only. Each of these filters, which may also include amplifiers with selective circuits intercoupling the stages, feeds output to full wave rectifiers 51, 52 and 53 respectively. The tubes of rectifier 51 are so connected with respect to the rectifier load 58, that the potential drop across 58 is positive at the cathode end thereof. The same remarks apply to the rectifier 52 and its load 60 and the rectifier 53 and its load 62. The load resistors 58 and 60, and 62 are connected in series between the cathodes of the tubes of rectifier 51 and ground and the polarity of the connections is such that the upper end of load resistor 62 is negative with respect to ground (when rectification takes place) as is the upper end of the load resistor 60 so that the potential drops in these loads add in series. However, the upper end of load resistor 58 is positive and the series added potentials mentioned in the preceding sentence oppose this potential. The potential drops characteristic of the side band amplitudes then are totaled and used to oppose the potential drop characteristic of the carrier intensity. The resistors 58, 60 and 62 are shunted by condensers 59, 61 and 63. The cathode end of load resistor 58 is connected to the cathode of a diode 64, the anode of which is coupled by resistor 66 and time delay condenser 68 to the lead 28 described hereinbefore. This resistor 66 is also connected by a resistor R and potentiometer P to ground. The free end of potentiometer P is connected to the negative terminal of a source of potential, the positive terminal of which is grounded.

In operation, filter 41 passes carrier only, which is rectified to produce in resistor 58 a potential drop which is a measure of the carrier intensity. Filters 42 and 43 pass side band energy only, which is rectified to produce in resistors 60 and 62 potential drops which are a measure of the respective side band intensities. The potentials representative of the side bands are opposed to the potential representative of the carrier so that at the cathode end of resistor 58, the potential is zero when the carrier magnitude is equal to the combined side band magnitudes, is negative when the combined side band magnitudes are greater than the carrier magnitude and is positive when the carrier magnitudes exceeds the combined side band magnitude. The output when negative passes through the diode gate tube 64, through the resistor R and a portion of the potentiometer P to ground. By means of the source connected to the end of the potentiometer opposite to ground, the normal grid bias voltage of fixed value is supplied to the carrier and side band amplifier in unit 14, operating here at intermediate frequency.

The voltage available at the plate of the diode gate tube is fed through a suitable time constant circuit including resistor 66 and condenser 68 to the control grids of the carrier and side band amplifier unit 14.

When the total rectified side band voltage equals the rectified carrier voltage, no additional negative bias is supplied by the rectifier system including 51, 52 and 53 to the gain control circuits 28 so that the gain in unit 14 is as adjusted by potentiometer P, resistor R and so forth. If, however, the carrier voltage fades below the side band voltage the difference between the carrier voltage and the side band voltage appears at the plate of the gate tube 64. This applies additional negative bias over the circuit 28 to the grids of the amplifier stages in unit 14 and the additional negative bias is of such a value that the gain of this amplifier is reduced to a point at which it cannot contribute to the combined diversity output. On the other hand, if the side band voltage is less than the carrier voltage or if the modulation ceases, the positive potential derived from the rectified carrier and applied to the cathode of diode 64 cannot pass the diode gate tube and its effect is not felt in the carrier and side band amplifier 14.

In reception employing spaced antennas, polarization or frequency diversity systems, the overall effect of the device described above is to continually analyze the modulation strength in relation to the carrier strength. If this proportion from the receiver which is contributing the major output or any part of the combined output is less than unity, the output of this receiver is rejected and the system passes along to select the next strongest carrier. It samples the relation of carrier to side bands, searching for an output which is free of selective fading distortion.

Each of the three receivers has a similar means for analyzing the relative magnitudes of the carrier and side bands and for reducing the gain of its intermediate frequency amplifier when the ratio of the carrier to the side bands is unfavorable as described hereinbefore.

As to the remaining operation of the diversity receiver, it will be noted that the same is well known in the art and needs little discussion here. When the receivers are all getting signals of about the same carrier strength, they may all contribute substantially equally to the output developed in the common load 30. If there is material difference in the strengths of the carrier received by the various receivers, that one having the strongest signal will supply output which predominates in the load 30 and the biasing resistor 36.

The time constant of elements 38 and 40 is fast enough to respond to potential variations which are of a frequency below signal frequency but is too slow to respond to potential variations representing the signals.

The time constant elements 66 and 68 respond to the modulating voltages (potential variations representing the signals). When modulation is present there appears at the cathode of tube 64 a voltage which is the difference between the carrier voltage and the combined side band voltage. If the side band voltage exceeds the carrier voltage, then tube 64 becomes operative. The choice of values of elements 66 and 68 is therefore one which permits the gain of tubes 16 and 18 to respond to a frequency below the potential representing the signals. In other words, the time constant of element 66 and 68 should be of such value that in event of low frequency modulation—the gain of tubes 16 and 18 would not respond to each cycle of modulation—but rather to an average of the modulating potentials.

What is claimed is:

1. In a diversity system for reception of waves comprising a carrier and its side bands resulting from control of a carrier characteristic in accordance with signals, in combination, a plurality of receivers each comprising an amplifier stage of variable gain and a common output circuit for all of the receivers, means in each receiver including filters and rectifiers for separating the carrier from the side bands and for deriving from the carrier and side bands in each receiver a potential which is determined by the ratio of the sum of the side band energies to the carrier energy, a gain control circuit in each receiver actuated by the derived potential in that receiver, in response to an increase of said ratio above unity, to control the operation of the amplifier of variable gain in the same receiver, and means for supplying output to said common load from that receiver having the strongest signal input.

2. In a diversity system for reception of radiant energy comprising a carrier and its side bands resulting from modulation of the carrier in accordance with signals, in combination, a plurality of receivers with radiant energy pick-up devices arranged for space, polarization, or frequency diversity, an amplifier of variable gain for each of said receivers, said amplifiers each having a band pass characteristic of sufficient width to amplify currents representing the carrier and side bands, a common output circuit coupled to all of said amplifiers, a carrier filter in each of said receivers, an upper side band filter in each of the said receivers and a lower side band filter in each of the said receivers, a rectifier coupled to each of said filters, load impedances in each of said rectifier circuits, means connecting the load impedances for each receiver together to combine the potentials developed therein, the polarities of the rectifiers in each receiver being such that the potential representative of the carrier amplitude in each receiver is opposed by the potentials representative of the side band amplitudes in each receiver, and means for applying each resultant potential as a gain control potential to the amplifier in the respective receiver in response to negative values of the resultant potential and for blocking the resultant gain control potential from the respective amplifier in response to positive values of the resultant potential.

3. In a diversity system for reception of radiant energy comprising a carrier and its side bands resulting from modulation of the carrier in accordance with signals, in combination, a plurality of receivers with radiant energy pick-up devices arranged for space, polarization, or frequency diversity, an amplifier of variable gain for each of said receivers, said amplifiers each having a band pass characteristic of sufficient width to amplify currents representing the carrier and side bands, a common output circuit coupled to all of said amplifiers, a carrier filter in each of said receivers, an upper side band filter in each of the said receivers and a lower side band filter in each of the said receivers, a rectifier coupled to each of said filters, load impedances in each of said rectifier circuits, means connecting the load impedances for each receiver together to combine the potentials developed therein, the polarities of the rectifiers in each receiver being such that the potential representative of the carrier amplitude in each receiver is opposed by the potential representative of the side band amplitudes in each receiver, means for applying each resultant potential as a gain control potential to the amplifier in the respective receiver in response to negative values of the resultant potential and for blocking the resultant gain control potential from the respective amplifier in response to positive values of the resultant potential, and common automatic gain control means for all of said receivers.

WALTER I. MATTHEWS.

REFERENCES CITED

The following references are of record in the file of this patent:

UNITED STATES PATENTS

| Number | Name | Date |
|---|---|---|
| 1,913,428 | Bruce | June 13, 1933 |
| 1,922,059 | Ohl | Aug. 15, 1933 |